(12) United States Patent
You

(10) Patent No.: US 6,522,040 B2
(45) Date of Patent: Feb. 18, 2003

(54) PALM TOP MANUAL OPERATED GENERATOR

(76) Inventor: Qiu Ming You, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 09/938,441

(22) Filed: Aug. 21, 2001

(65) Prior Publication Data

US 2002/0047333 A1 Apr. 25, 2002

(51) Int. Cl.[7] .................. H02K 23/00; F01D 15/00; F02N 11/00
(52) U.S. Cl. .................. 310/96; 310/99; 310/112; 290/4 A; 290/4 R; 290/1 A; 290/1 R
(58) Field of Search .................. 310/46, 47, 96, 310/40 MM, 99, 118, 102 R, 112, 113, 166, 171; 290/1 A, 1 B, 1 C, 4 A, 4 R, 4 B, 4 C, 4 D; 322/28, 40, 52

(56) References Cited

U.S. PATENT DOCUMENTS

| | | | | |
|---|---|---|---|---|
| 4,486,667 A | * | 12/1984 | Srogi | 290/1 R |
| 4,498,014 A | * | 2/1985 | Reyes | 290/4 R |
| 4,691,119 A | * | 9/1987 | McCabria | 310/112 |
| 4,694,187 A | * | 9/1987 | Baker | 290/4 R |
| 5,089,734 A | * | 2/1992 | Bickraj | 310/115 |

* cited by examiner

*Primary Examiner*—Tran Nguyen

(57) ABSTRACT

A palm top manual operated generator includes a housing, a power generating unit, a driving set, a handle and a spring. The housing has a cambered rack which penetrates into the housing and is engaged with the first speed change gear of the driving set. After changing speed by a plurality of speed change gears of the driving set, power is unidirectionally transferred to a gear of the power generating unit through a unidirectional speed change gear. A plurality of magnets are circularly arranged within the rotary casing. When the handle is held and pressed continuously, the cambered rack drives the driving set. Then rotary speed is increased to drive the rotary casing of the power generating unit to rotate with a high speed. Thereby, electric power is generated due to magnetic excitation; the electric power is outputted from a receptacle through a regulating circuit and a power storage circuit.

9 Claims, 7 Drawing Sheets

PALM TOP MANUAL OPERATED GENERATOR

BACKGROUND OF THE INVENTION

1. Field of the Invention

The present invention relates to generators, and particularly to a palm top manual operated generator.

2. Description of Related Art

Small type generators are generally used outdoors as power supplies, which can be carried conveniently. According to designs of generators, they can be divided into rotary type generators and reciprocal type generators.

The rotary type generator has a steady rotary speed, but the handle is too small without matching the requirement of ergonomics. Thus, it is hard to apply a force thereon and can not be operated for a long time. Moreover, in use, it must be operated by two hands. The structure of the handle will increase the volume of the device and thus it is inconvenient in storage.

The reciprocal generator has a press portion which only occupies a small space and therefore, it can be carried and stored easily. However, in operation, the work is applied only one half of the operation time period. Furthermore, a strong shock is generated at the reverse point of the operation. The press portion moves longitudinally so that the fingers must apply a large force thereon. Moreover, the pulses are unstable and therefore, it is unsuitable to be used as a power supply of mobile phones.

SUMMARY OF THE INVENTION

Accordingly, the primary object of the present invention is to provide a palm top manual operated generator, wherein a steady power is generated. The present invention has a small volume and is portable without occupying a large space. Therefore, it is used as a real-time power supply.

Another object of the present invention is to provide a palm top manual operated generator wherein the present invention is operated by one hand. The handle is designed to match the requirement of ergonomics. Therefore, it can be operated easily with a small force.

Another object of the present invention is to provide a palm top manual operated generator, wherein the power generating unit does not rotate along a reverse direction.

A further object of the present invention is to provide a palm top manual operated generator, wherein the present invention has functions of voltage stability and power storage, and is preferred in rectifying and circuit protection. Therefore, it is used as power of a mobile phone.

To achieve above objects, the present invention provides a palm top manual operated generator, comprises a housing, a power generating unit, a driving set, a handle, and a spring.

The housing is formed by two matched covers.

The power generating unit is installed at an upper side of an interior of the housing for generating power.

The driving set is installed at a lower side of an interior of the housing and formed by a plurality of speed change gears for driving the power generating unit.

The handle has an upper end pivotally installed in front of the housing for driving the driving set.

The spring is installed within the housing for resisting against the handle, thereby, the housing having a function of restoring automatically.

After assembling above components, a cambered rack at the handle penetrates through the housing and is engaged with a first speed change gear of the driving set. After changing speed by a plurality of speed change gears of the driving set, power is unidirectionally transferred to a gear of the power generating unit through a unidirectional speed change gear. Then a magnetic rotary casing of the power generating unit rotates with a high speed. A plurality of magnets are circularly installed within the rotary casing. These magnets are arranged around a periphery of a core, wherein a plurality of coils wind around the core. Power wires are connected to the core and are then further connected to a regulating circuit board, and then wires are connected to a receptacle from the regulating circuit board.

When the handle is held and pressed continuously, the cambered rack drives the driving set. Then rotary speed is increased so as to drive the rotary casing of the power generating unit to rotate with a high speed. Thereby, electric power is generated due to magnetic excitation. The electric power is outputted from a receptacle through a regulating circuit and a power storage circuit. The various objects and advantages of the present invention will be more readily understood from the following detailed description when read in conjunction with the appended drawing.

DETAILED DESCRIPTION OF THE PREFERRED EMBODIMENTS

The details will be described in the following.

Figure 1:
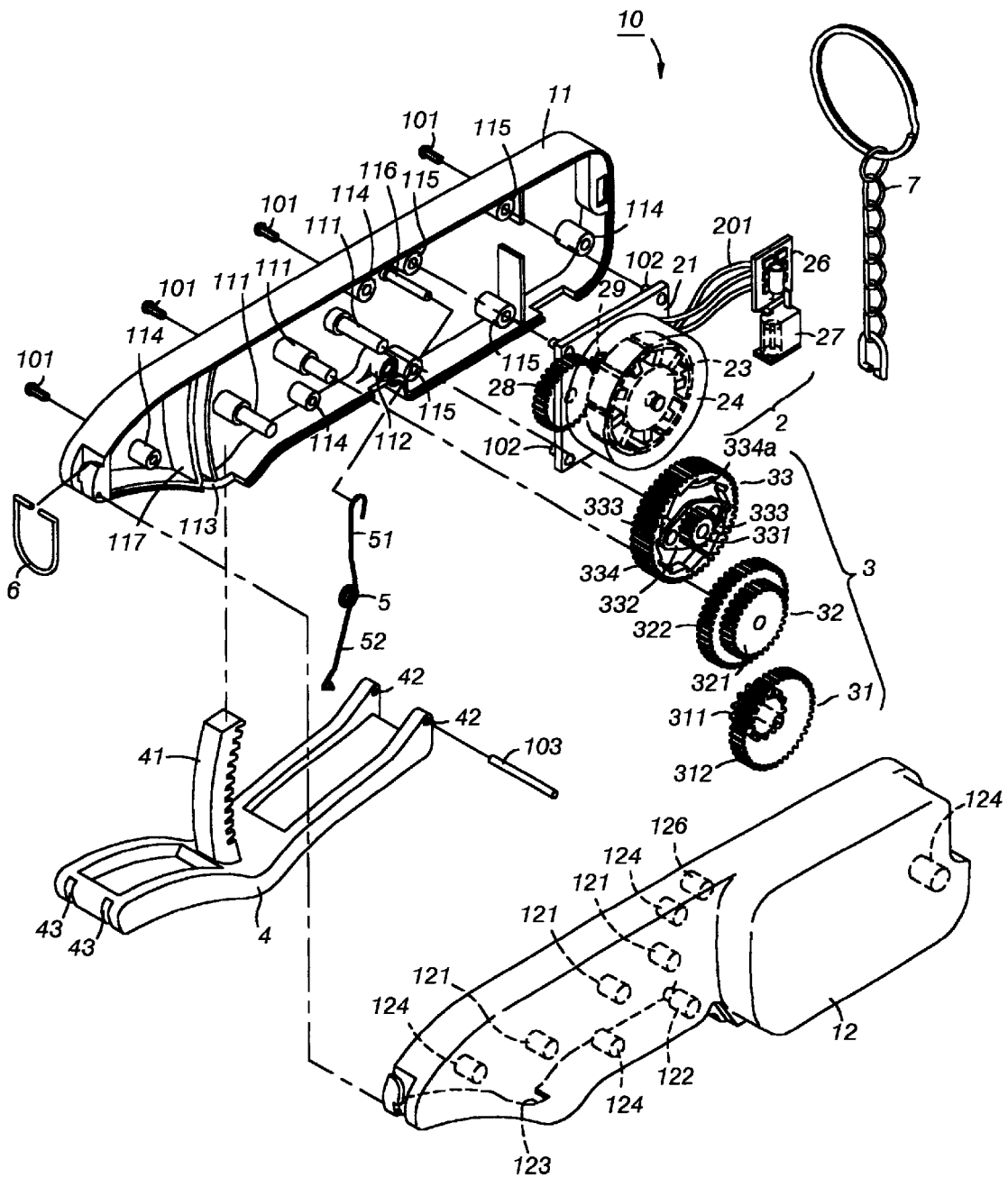
FIG. 1 is an exploded perspective view of the palm top manual operated generator of the present invention.
Figure 2:
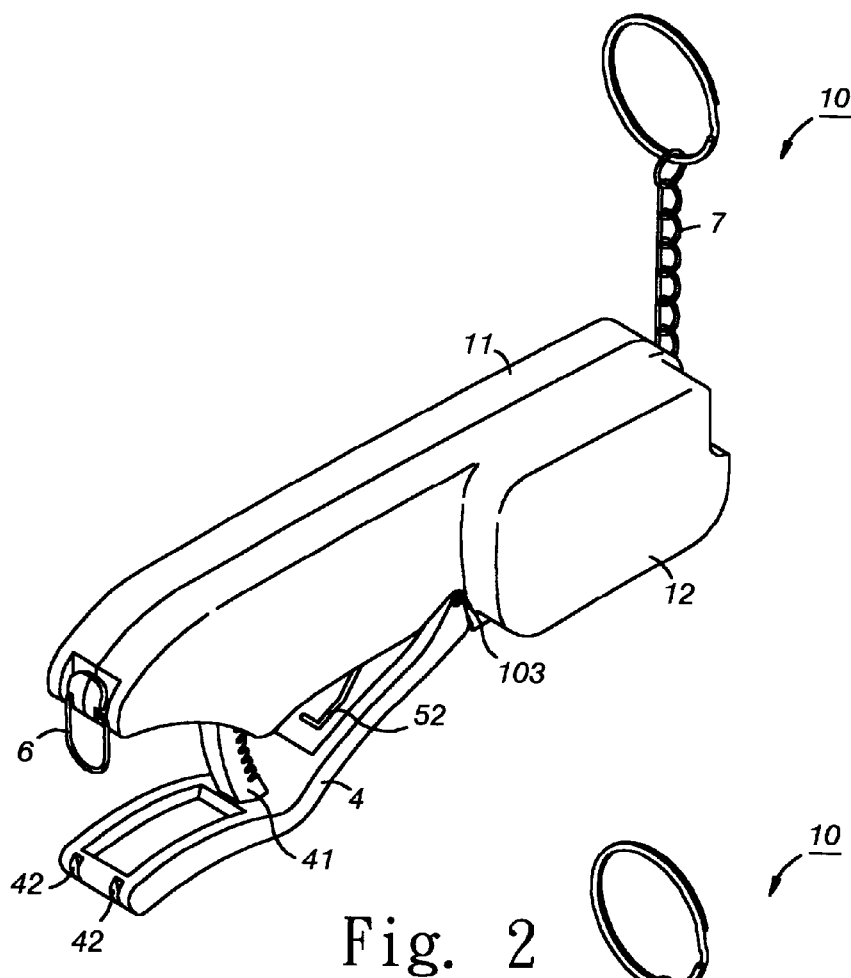
FIG. 2 is an exploded perspective view of the palm top manual operated generator of the present invention.

Referring to FIG. 1, an exploded perspective view of the palm top manual operated generator is disclosed. A generator 10 is disclosed in the drawing. The generator 10 is formed by a housing 1, a power generating unit 2, a driving set 3, a handle 4, a spring 5, a buckling ring 6. The top of the housing 1 may be further installed with a chain ring 7 for hanging articles. The assembled perspective view of the present invention is illustrated in FIG. 2.

Figure 3:
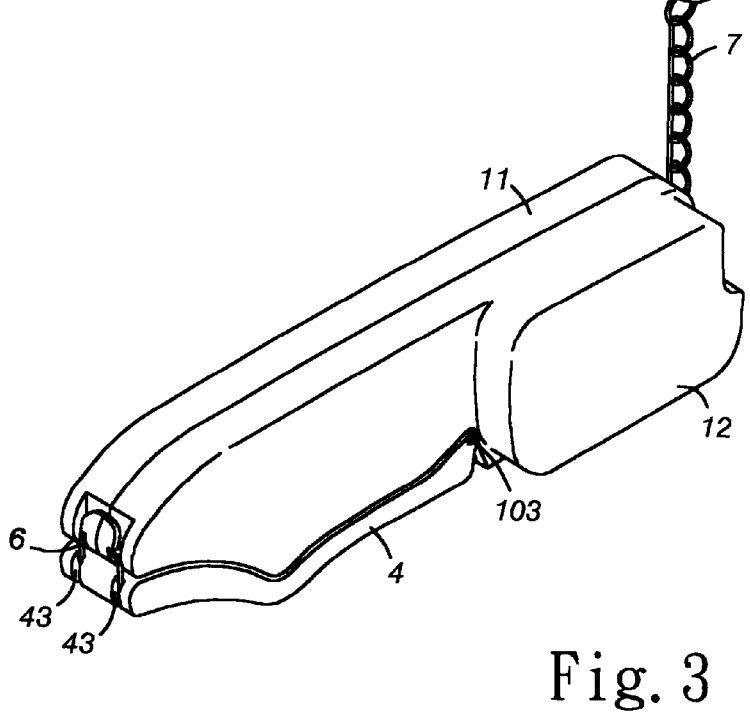
FIG. 3 is an assembled perspective view of the palm top manual operated generator of the present invention.

As above description, the housing 1 is formed by two coupled covers 11 and 12. The two covers 11 and 12 are combined and fixed by four screws 101. Next, the lower end of the housing 1 is mounted with the buckling ring 6 for being pressed into two trenches 43 on the handle 4 (referring to FIG. 3) so that after the handle 4 is received, the whole volume is reduced.

The handle 4 is a V shape handle. A cambered rack 41 is mounted to a lowest point thereof. The upper end of the handle 4 has pivotal holes 42. A stud 103 passes through the pivotal hole 42 and then further passed through the holed posts 112 and 122 at proper positions in front of the housing 1. The cambered rack 41 is engaged with the recesses 113, 123. After being engaged, it is engaged with pinions 311 of the first speed change gear 311 of the driving set 3 (further referring to FIG. 8). Since in driving process, the cambered rack 41 will rub the pinion 311 continuously, to reduce wearing between the two, it is preferred that the cambered rack 41 and the pinion are made of metal. The handle 4 is an arm of force applied along a rotary center of stud 103. The cambered rack 41 is utilized as a force resisting point. To apply force conveniently, the cambered rack 41 is installed at the lowest point of the handle 4 so as to match the requirement of ergonomics. Further, to cause that the handle 4 has the function of restoring automatically, a spring 5 having two pins is pivotally installed on the stud 103. One pin 51 is hooked to the shaft 116. The shaft 116 is pivotally installed to the holed post 126. Another pin 52 resists against the rear surface of the handle 4. Besides, after the cambered rack 41 passes through the housing 1, it moves along and confined by the cambered groove 117.

Figure 4:
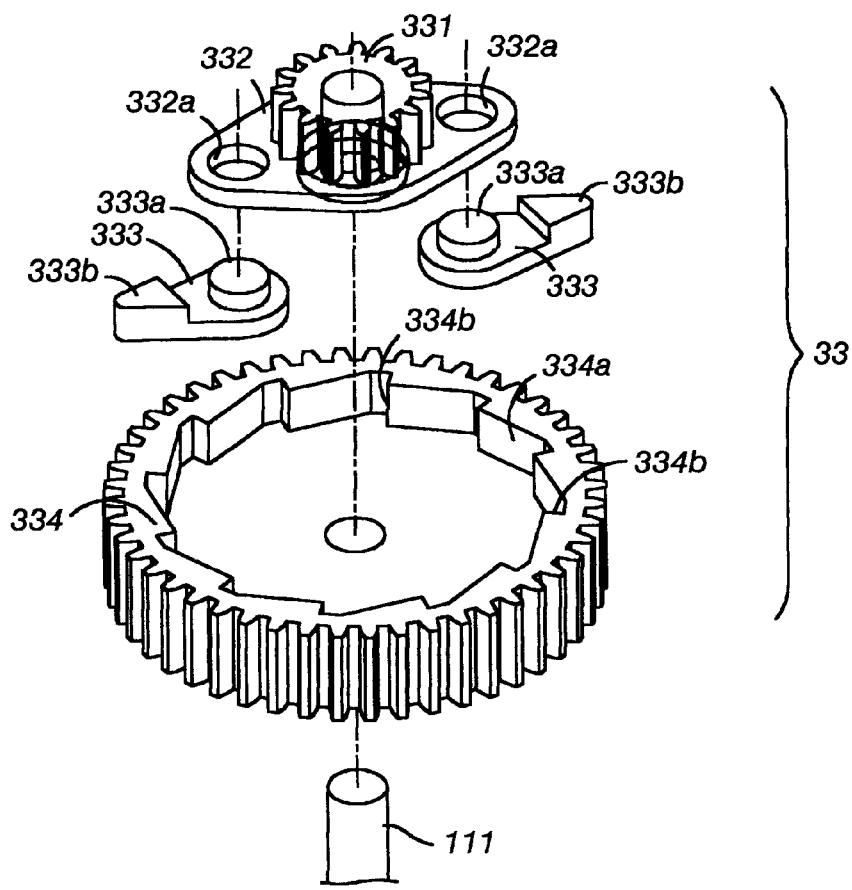
FIG. 4 is an exploded perspective view of the unidirectional speed change gear in the present invention.

The driving set 3 includes a first speed change gear 31, a second speed change gear 32 engaged with the first speed change gear 31, and a unidirectional speed change gear 33. These three gears are pivotally mounted to three studs 111 on the cover 11. The three studs are pivotally installed in the holed posts 121. The first speed change gear 31 is formed by a pinion 311 and a large gear 312. The second speed change gear 32 is formed by a pinion 321 and a large gear 332. The structure of the unidirectional speed change gear 33 is illustrated in FIG. 4, which is formed by a pinion 331 fixed on a prism plate 332, two round blocks 333 and a large gear 334. The prism plate 332 has two ends each having a through hole 332a. The buttons 333a of the two round blocks 333 can be pivotally installed to the through holes 332a to pivotally move therein. The inner wall of the large gear 334 has a unidirectional teeth groove 334a. Each tooth in the groove 334a has a vertical stopping wall 334b. After the protrusion 333b of the block 333 is stopped by the stopping wall 334b, the large gear 334 drives an object unidirectionally.

Figure 5:
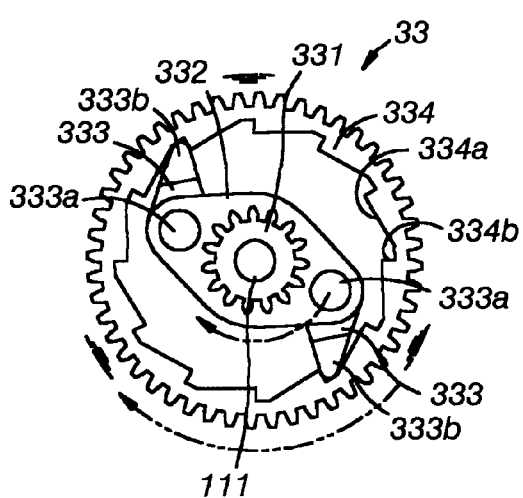
FIG. 5 is a perspective view showing that the unidirectional speed change gear of the present invention rotates clockwise.
Figure 6:
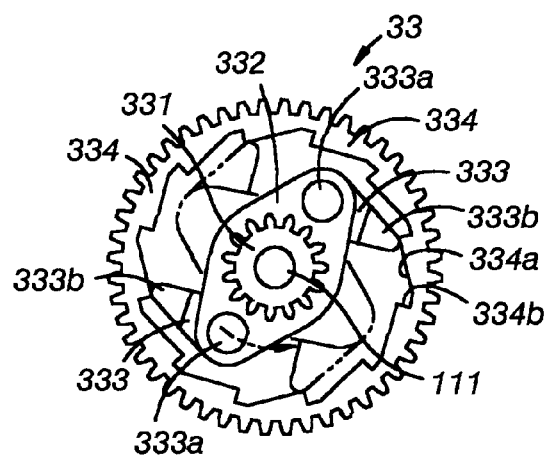
FIG. 6 is a perspective view showing that the unidirectional speed change gear of the present invention rotates counterclockwise.

The operations of the unidirectional speed change gear 33 is illustrated in FIGS. 5 and 6. FIG. 5 shows a schematic view, wherein the pinion and large gear rotate at the same direction. When the pinion 331 rotates clockwise, the prism plate 332 drives the two round blocks 333. The protrusions 333b of the round blocks will be in the unidirectional teeth grooves 334a of the large gear 334 and are stopped by the stopping wall 334b so that the large gear 334 rotates clockwise. On the contrary, as shown in FIG. 6, when the pinion 331 rotates counterclockwise, the prism plate 332 drives the two round blocks 333 to rotate along an opposite direction. The two round blocks will cause that the protrusions 333b slide through the teeth block of the unidirectional teeth groove 333 without being stopped by the stopping wall 334b. Therefore, the large gear 334 will not rotate along an opposite direction. Only the pinion 331 and the prism plate 332 rotate idly.

Figure 7:
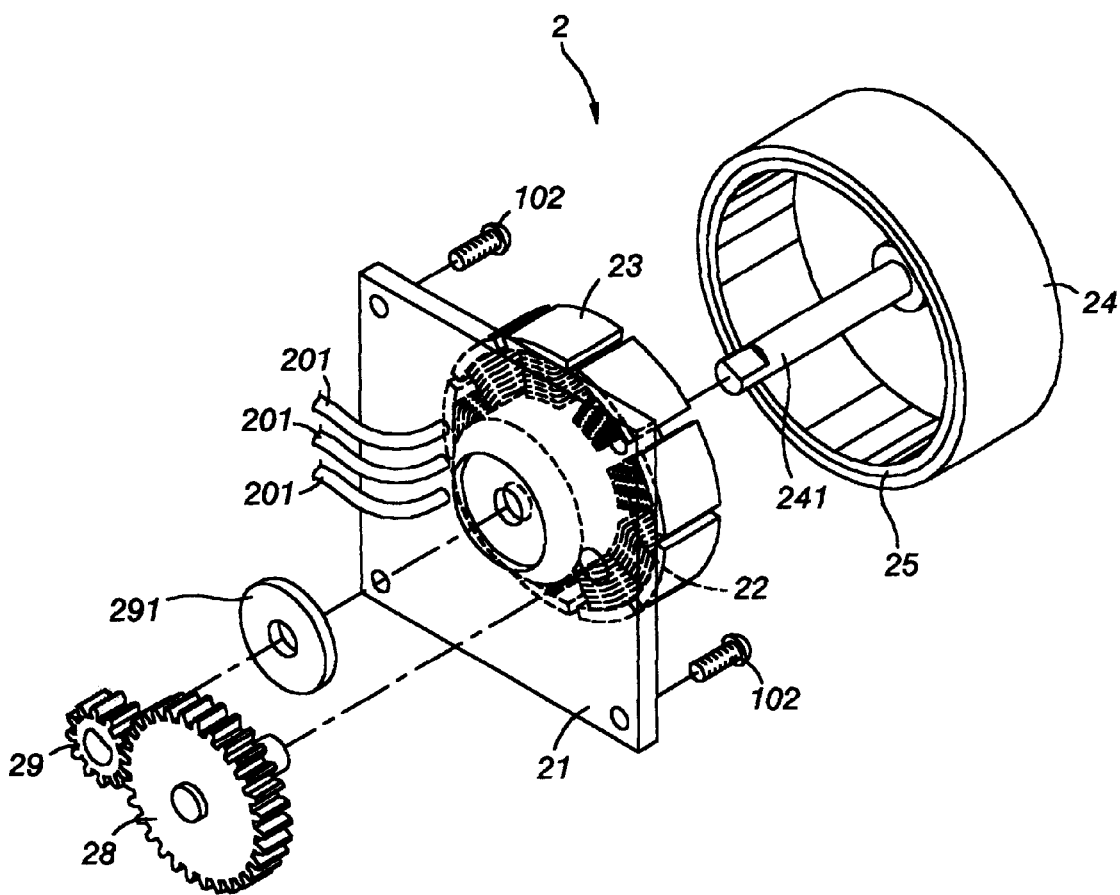
FIG. 7 is an exploded perspective view of the power generating unit of the present invention.

An exploded perspective view of the power generating unit of the present invention is illustrated in FIG. 7. The power generating unit 2 is formed by a substrate 21, an interface gear 28 and an acceleration gear 29 at the back surface of the substrate 21, a core 23 mounted on the substrate 21 and wound by a plurality of coil sets 22, a rotary casing 24 having a shaft 241, a plurality of magnets 25 mounted at positions with respect to the core 23 and circularly arranged within the rotary casing 24, a regulating circuit board 26 and a receptacle 27. The N and S polarities of the magnets are alternatively arranged in the casing 24. The substrate 21 is combined and fixed by screwing four screws 102 into the holed posts 115 of the covers 11. The shaft 241 of the rotary casing 24 passes through the axial hole of the core 23 and then is combined with the washer 291 and the acceleration gear 29. The core 23 and the regulating circuit board 26 are connected in parallel by wires 201 of three different phases. Other then voltage regulation, the regulation circuit may store electric power. Moreover, the circuit may be connected to the receptacle in series. Therefore, current is outputted through the receptacle 27.

Figure 8:
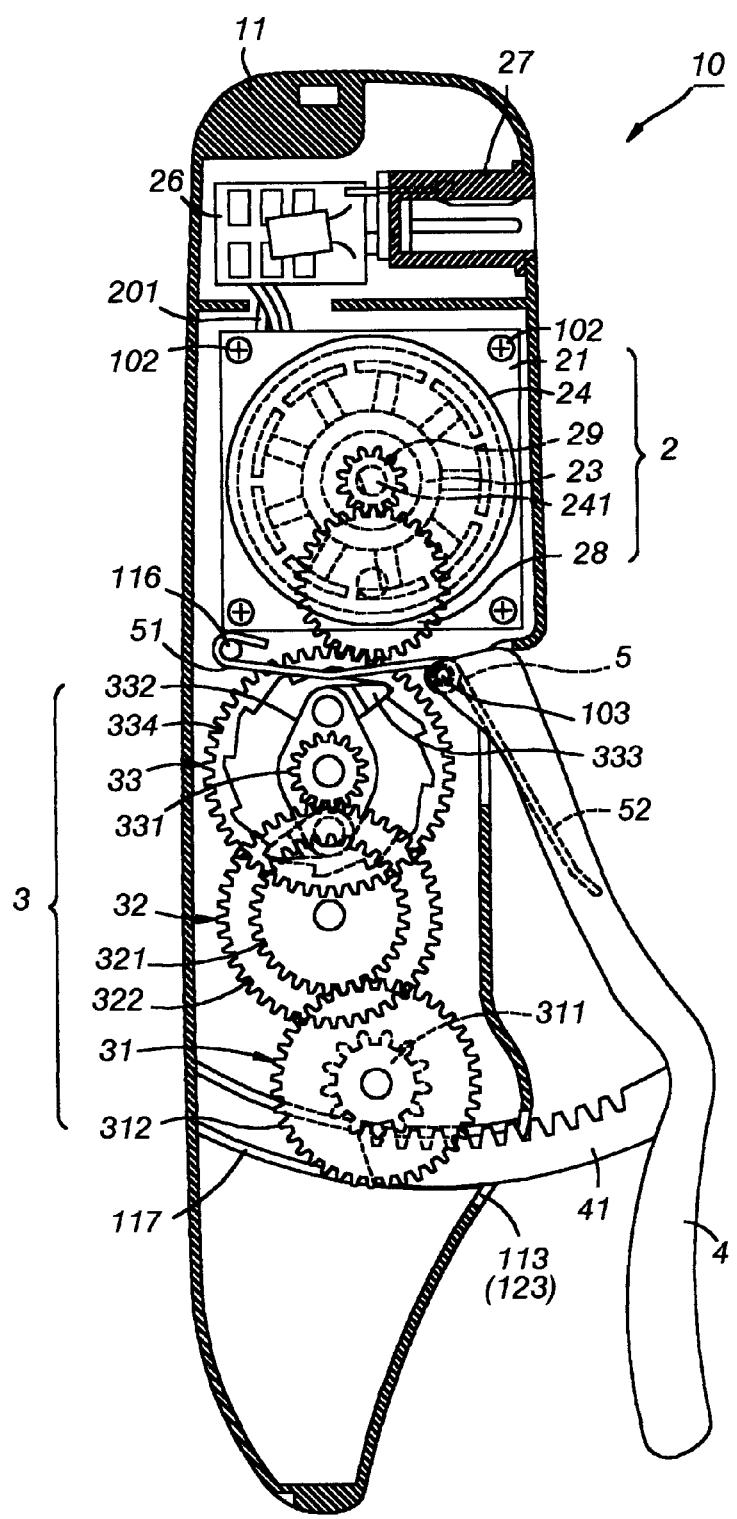
FIG. 8 is a cross sectional view of the palm top manual operated generator of the present invention.

The cross sectional view of the manual operated generator according to the present invention is illustrated in FIG. 8. The relations of the components are illustrated. The cambered rack 41 is engaged with the first speed change gear 3 1. The unidirectional speed change gear 33 is engaged with the interface gear 28 of the power generating unit 2. The interface gear 28 is engaged with the acceleration gear 29. The acceleration gear 29 is coaxial with the rotary casing 24. The transmission process will be described hereinafter.

1. The cambered rack 41 of the handle 4 drives the pinion of the first speed change gear 31. Since the pinion 311 and the large gear 312 are mounted integrally, they rotate synchronously.
2. The large gear 312 of the first speed change gear 31 dives the pinion 321 of the second speed change gear 32. Since the pinion 321 and the large gear 322 are integrally installed, they rotate synchronously.
3. The large gear 322 of the second speed change gear 32 dives the pinion 331 of the unidirectional speed change gear 33. Therefore, the large gear 334 rotates synchronously by the driving of the block 333.
4. The large gear 334 of the unidirectional speed change gear 33 drives the interface gear 28. Then, the interface gear 28 drives the acceleration gear 29. Finally, the rotary casing 24 rotates.

When the rotary casing 24 of the power generating unit 2 rotates along an opposite direction with a high speed, the magnet 25 and coil sets 24 of the core 23 in the casing 24 will generate power. Power is outputted to the regulating circuit board 26 through a power wire 201. After voltage regulating and power storage, the power is outputted through the receptacle 27.

Figure 9:
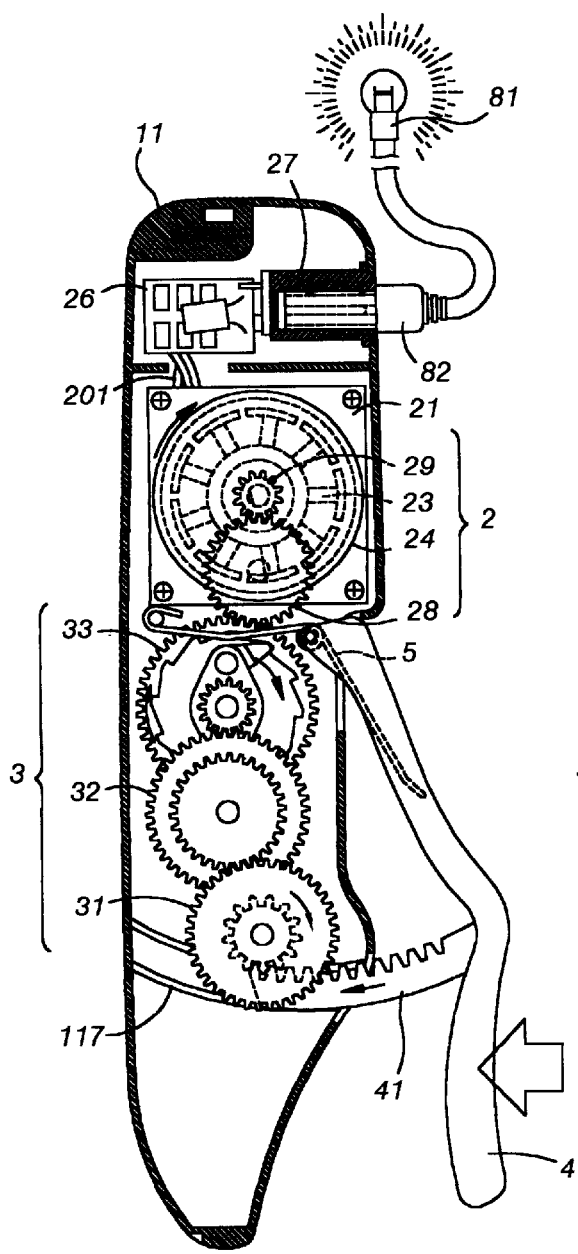
FIG. 9 shows that the palm top manual operated generator of the present invention is used in an illuminator.

A schematic view showing the application of the palm top manual operated generator of the present invention is illustrated in FIG. 9. It is shown that when the handle 4 is held and pressed by a hand, the power generating unit 2 is driven through a driving set 3 so that the rotary casing 24 rotates with a high speed to generate electric power. The power flows through the regulating circuit and then is outputted from the receptacle to an electric device (for example, an illuminator 81). The receptacle 82 of the illuminator must be inserted into the receptacle 27.

Figure 10:
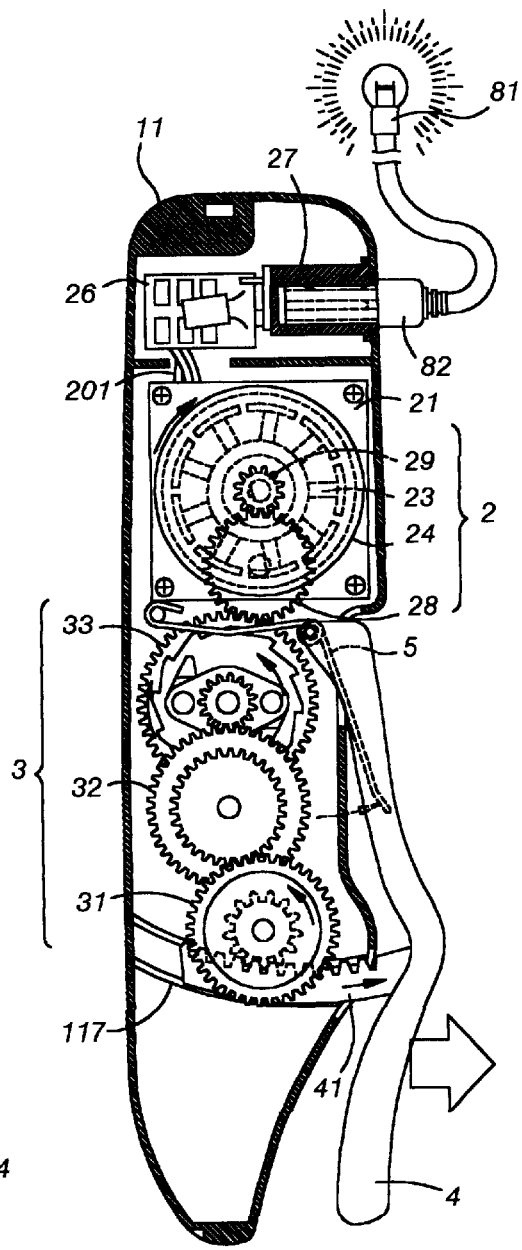
FIG. 10 is a perspective view showing that the unidirectional speed change gear of the present invention rotates clockwise.

In FIG. 10, as the user releases the handle 4, the handle 4 restores to the original position due to the restoring force of the spring 5. Then, the cambered rack 41 will drive the driving set 3 along an opposite direction. By the idle rotation of the unidirectional speed change gear 33, the interface gear 28 of the power generating unit 2 will not be driven. Therefore, the casing 24 continuously rotates clockwise so as to generate power. The power is provided to the illuminator 81.

Figure 11:
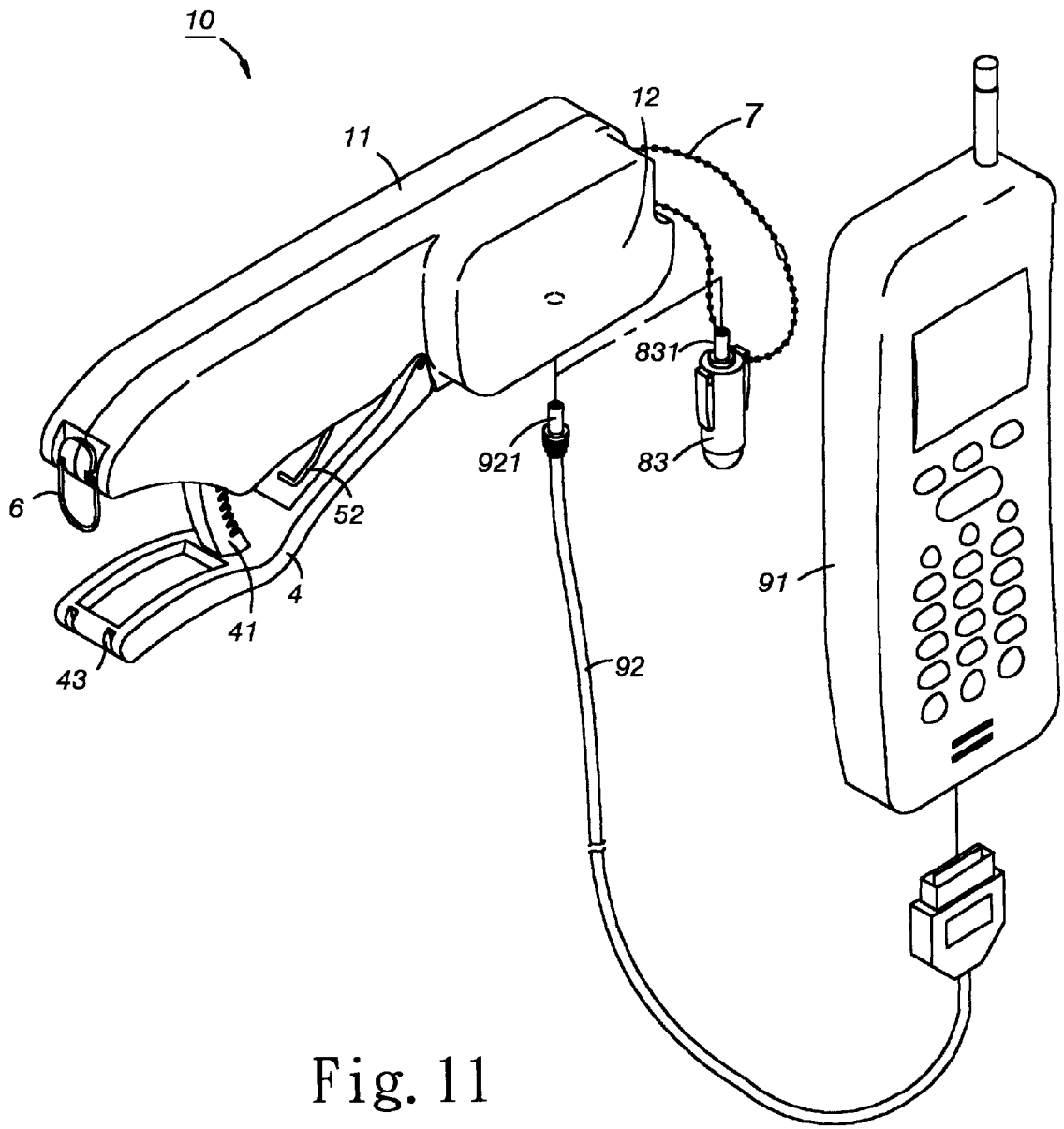
FIG. 11 is a schematic view showing that the palm top manual operated generator of the present invention is used to a bulb and a mobile phone.

FIG. 11 is a schematic view showing the palm top manual operated generator of the present invention being used in a bulb and a mobile phone. The receptacle 27 of the palm top manual operated generator 10 is utilized with the joint 831 of a lamp seat 83, or the joint 921 of a power wire 92 of a mobile phone 91. Therefore, the lamp seat 83 or the mobile phone 91 is supplied with power. Moreover, the present invention can be utilized in other electronic products, such as signal generators, recorders, etc.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A palm top manual operated generator, comprising:
   a housing formed by two matched covers;
   a power generating unit installed at an upper side of an interior of the housing for generating power;
   a driving set installed at a lower side of an interior of the housing and formed by a plurality of speed change gears for driving the power generating unit;
   a handle having an upper end pivotally installed in front of the housing for driving the driving set; and
   a spring installed within the housing for resisting against the handle, thereby, the housing having a function of restoring automatically;
   wherein after assembling above components, a cambered rack at the handle penetrating through the housing and is engaged with a first speed change gear of the driving set; after changing speed by a plurality of speed change gears of the driving set, power is unidirectionally transferred to a gear of the power generating unit through a unidirectional speed change gear; then a magnetic rotary casing of the power generating unit rotates with a high speed; a plurality of magnets are circularly installed within the rotary casing; these magnets are arranged around a periphery of a core, wherein a plurality of coils winds around the core; further power wires are connected to the core and are then connected to a regulating circuit board, and then wires are connected to a receptacle from the regulating circuit board; and
   when the handle is held and pressed continuously, the cambered rack drives the driving set; then rotary speed is increased so as to drive the rotary casing of the power generating unit to rotate with a high speed; thereby, electric power is generated due to magnetic excitation; the electric power is outputted from a receptacle through a regulating circuit and a power storage circuit.

2. The palm top manual operated generator as claimed in claim 1, wherein the power generating unit is formed by a substrate, an interface gear and an acceleration gear at a back surface of the substrate, a core mounted on the substrate and wound by a plurality of coil sets, a rotary casing having a shaft, a plurality of magnets mounted at positions with respect to the core and circularly installed within the rotary casing, a regulating circuit board and a receptacle; wherein N and S polarities of the magnets are alternatively arranged around the rotary casing.

3. The palm top manual operated generator as claimed in claim 1, wherein the driving set includes a first speed change gear, a second speed change gear engaged to the first speed change gear, and a unidirectional speed change gear engaged to the second speed change gear.

4. The palm top manual operated generator as claimed in claim 3, wherein each of the first speed change gear and second speed change gear is formed by a pinion and a large gear.

5. The palm top manual operated generator as claimed in claim 1, wherein a structure of the unidirectional speed change gear is formed by a pinion fixed on a prism plate, two blocks and a large gear; the prism plate has two ends each having a through hole; buttons of the two round blocks are pivotally installed to the through holes to pivotally move therein; an inner wall of the large gear has a unidirectional teeth groove; each tooth in the groove has a vertical stopping wall.

6. The palm top manual operated generator as claimed in claim 1, wherein the handle is a V shape handle; a cambered rack is mounted to a lowest point thereof; and the cambered rack moves along a cambered groove.

7. The palm top manual operated generator as claimed in claim 1, wherein the spring has two pins; the pins of the spring are pivotally installed on the stud; one pin is hooked to the shaft; the shaft is pivotally installed to holed posts; another pin resists against a rear surface of the handle.

8. The palm top manual operated generator as claimed in claim 1, wherein a lower end of the housing is mounted with a buckling ring, and the buckling ring is pressed into two trenches on the handle.

9. The palm top manual operated generator as claimed in claim 1, wherein a cambered rack of the handle and the pinion of the first speed change gear are made of metal.

* * * * *